3,235,468
MEAT TENDERING COMPOSITIONS
John M. Hogan, Oak Lawn, Ill., assignor to Swift & Company, Chicago, Ill., a corporation of Illinois
No Drawing. Filed July 6, 1961, Ser. No. 122,110
5 Claims. (Cl. 195—62)

This application is a continuation-in-part of my prior copending application Ser. No. 111,467, filed May 22, 1961, now Patent No. 3,052,551.

This invention relates to the method of tenderizing meat by introducing proteolytic enzymes into living animals to obtain uniform distribution of the enzymes throughout the meat tissues and more particularly to improved highly active proteolytic enzyme compositions adapted for use in this method.

There is disclosed in U.S. Patent No. 2,903,362 to Beuk et al. a method of treating living animals from which meat is to be obtained with proteolytic enzymes to provide, after slaughtering, carcasses and meat cuts which are characterized by an improved tenderness when cooked. This process is employed to provide meat products of improved tenderness and desirable texture. These qualities are attributed to the substantially uniform distribution of the proteolytic enzyme in the meat tissues.

While a satisfactory method for preparing enzymes in a form suitable for use in this process is disclosed in the patent, and the meat products produced in accordance with the method of the patent possess the desired improved tenderness and texture, further and additional improvements upon this process have been developed. These improvements allow for standardization of the enzyme employed in the process and control of the tenderizing action by pretreatment of the enzyme before introduction into the animal and, also, adjustment of the enzymatic activity and control of the amount of a given enzyme of a predetermined activity which is introduced into the animal.

One of the types of enzyme utilized in the practice of the Beuk et al. process are those proteolytic enzymes derived from plant sources. It is known that proteolytic enzymes derived from plant materials are of variable constitution. Variations in constitution of the enzyme are also introduced in the handling of the enzyme during processing so that the protein content, proteolytic activity, color, odor, contamination, etc., will vary widely depending upon the source of the enzyme and the processing to which it has been subjected.

Crude papain, ficin, and bromelain contain a certain amount of enzymic materials which are active at temperatures in the range normally used in cooking meat products and, also, certain enzymic materials which are active at lower temperature and which may adversely affect the animal body processes. Satisfactory tenderization with a minimum of adverse physiological reactions in the animal is desired in the ante-mortem procedure. However, the degree of tenderization and the avoidance of physiological reactions is determined to a significant degree by the properties of the enzyme employed.

It is, therefore, an object of this invention to provide a method for treating crude enzymes however previously processed to provide an enzyme composition having a high ezymic activity at elevated temperatures and minimum enzymic activity at animal body temperatures.

Another object of the invention is the provision of meat treating enzyme compositions having substantial proteolytic activity on meat at cooking temperatures and a minimum proteolytic activity at temperatures below these cooking temperatures and around the body temperature of the meat-bearing animal.

Another object of the invention is the provision of a method for formulating proteolytic enzymes of varying proteolytic activities and purity to render said enzymes suitable for use in the ante-mortem procedure.

Additional objects, if not specifically set forth herein, will be readily apparent to those skilled in the art from the detailed description of the invention which follows.

Generally, the invention is concerned with the production of enzyme compositions having a high proteolytic activity and a reduced tendency to adversely affect meat-bearing animals into which they are introduced. The compositions are especially adapted for use in the tenderization of meats since they exhibit a high degree of proteolytic activity at normal cooking temperatures. Coupled with the high proteolytic activity in the range of about 140–210° F. is a minimum amount of proteolytic activity at temperatures below this range and specifically in the range around normal animal body temperature. Enzyme compositions which provide a high degree of tenderization at cooking temperatures and a minimum amount of adverse physiological effects on the animal include those which possess certain activity characteristics as represented by tyrosyl value and total and available milk clotting values, as well as meat tenderizing activity, as measured by tissue specificity assay.

More specifically, the invention comprises a tenderizing method and the tenderizing composition employed in this method to produce desirable tender meat cuts which are not overtenderized. It is also within the contemplation of the invention to treat plant-derived proteolytic enzymes, no matter how previously processed; to insure uniform tenderization when these treated enzyme compositions are employed in the process. The enzyme generally is derived from plant sources and possesses a proteolytic activity expressed as tyrosyl units per gram of 40,000 to 200,000 tyrosyl units. In solution the enzyme should have an activity expressed in tyrosyl units per milliliter of at least 250 and preferably 500 tyrosyl units and a ratio of tyrosyl units per milliliter to total milk clotting units per milliliter of 55–100, as well as demonstrating a satisfactory tissue specificity assay, at a temperature in the range of 140–210° F. Another characteristic of the enzyme solutions is that activity is also represented by a ratio of tyrosyl units per milliliter to available milk clotting units per milliliter of more than 200 and preferably more than 333. Plant enzymes which are most useful in formulating enzyme compositions having the desired characteristics are papain, ficin and bromelain.

The activity of a proteolytic enzyme as represented by tryosyl units provides a measure of the tenderizing effect of the enzyme. Since this determination is carried out at an elevated temperature, it measures potential tenderizing effect at these elevated temperatures. Milk clotting units is an expression of activity of the enzyme at 40° C. and is a good measure of activity at or near the animal's body temperature. Thus, it is a good measure of the likelihood of adverse physiological reactions presented by enzymic activity at body temperature. Accordingly, the activity represented by tyrosyl units ideally should be high and activity represented by milk clotting units, both total and available, should be low in relation to the tyrosyl units. The ratio of activity expressed as tyrosyl units to the activity expressed as total milk clot units and available milk clot units provides an evaluation of the meat tenderizing activity of the enzyme and, also, provides a measure of the likelihood of the enzyme composition to adversely affect the physiological processes of the animal.

Tyrosyl units represent the increased quantity of trichloracetic soluble compounds capable of producing color with the phenol color reagent equivalent to that produced by 100 micrograms of tyrosine, derived from 1 gram of meat, when the enzyme is incubated with meat for 1 hour at 80° C. under specified condition. Thus, the rating of an enzyme composition in tyrosyl units is a measure of the proteolytic activity of the enzyme on meat at or about 80° C. Although enzyme compositions having a considerable range of tyrosyl units per milliliter can be employed in the process, very dilute or extremely concentrated solutions are not generally recommended. Very dilute solutions containing enzyme in an amount sufficient to provide an activity represented by only about 100 tyrosyl units per milliliter require that excessively large volumes be introduced into the animal to obtain any measurable tendering effect. Where very concentrated preparations wherein enzyme actvity is around 10,000 tyrosyl units per milliliter are employed care must be employed in the metering and measuring of solution and careful control of the time between completion of the injection and slaughter must be maintained to avoid adverse reactions in the animal. Such concentrated solutions preferably should be diluted prior to use. In the preferred form, the enzyme solutions employed to obtain the benefits of this invention are characterized as possessing an activity expressed in tyrosyl units per milliliter of about 500 to about 5,000.

Milk clotting units express the measure of activity of a given enzyme at room temperature and this measurement is a good criterion of activity of the enzyme at or near the animal's body temperature. Thus, milk clotting activity can be correlated with the likelihood of adverse physiological reactions in the living animal treated with a given enzyme composition. Milk clotting assay involves the determination of total activity (inactive and active enzyme) and available activity (active enzyme) at about 40° C. Total enzyme activity includes both the available proteolytic activity and proteolytic activity which is inactive but can be regenerated to the active state.

High proteolytic activity of a given enzyme composition at or around cooking temperatures and a minimum proteolytic activity at temperatures below this range can be provided by adjusting the activity of the anzyme, particularly as measured by milk clotting activity. Papain, for example, should provide around 500–14,000 tyrosyl units per milliliter in aqueous solution and available milk clotting values in the range of about 0–42 units per milliliter. Within these broad ranges papain solutions having the following characterstics are most desirable:

| Composition | Tyrosyl Units Per Milliliter | Total Milk Clotting Units Per Milliliter | Available Milk Clotting Units Per Milliliter |
|---|---|---|---|
| Enzyme No. 1 | 500 | 5–10 | 0–1.5 |
| Enzyme No. 2 | 1,000 | 10–20 | 0–3 |
| Enzyme No. 3 | 5,000 | 50–100 | 0–15 |
| Enzyme No. 4 | 14,000 | 140–280 | 0–42 |

The most active enzyme solution containing 14,000 tyrosyl units per milliliter is not ordinarily employed in the process inasmuch as substantial care is required in metering and measuring the solution and also to insure uniform distribution. This solution can, however, be diluted to provide an activity in the desired range.

For best results it is desired that the enzyme be suspended in water in a concentration sufficient to provide an activity of about 1,000 tyrosyl units per milliliter. This permits introduction of the solution into the animal in a quantity of about 0.1–0.35 ml. per lb. of live animal weight. For the average animal in the range of 800–1,100 lbs. the total volume of enzyme solution required is then in the range of 80–385 ml. and this amount can be injected in about 16–77 seconds. More dilute solutions having only 500 tyrosyl units per milliliter must be introduced at the rate of about 0.2–0.7 ml. per lb. and with the average animal this requires about 160–770 ml. total injection. More concentrated solutions having about 5,000 tyrosyl units per milliliter require that only 0.02–0.07 ml. per lb. be introduced and the total mount is only 16–77 ml. which can be injected in 3–16 seconds although with these more concentrated solutions greater precision in the injection step is advisable.

Milk clotting and tyrosyl values for a given enzyme can be determined as follows:

MILK CLOTTING TEST

A. *Total activity.*—The enzyme, for example papain, is blended with glycerine to form a paste of 200 grams of papain powder and 200 grams of chemically pure glycerine. The resulting paste is dissolved in distilled water and the solution is diluted to a volume of 10,000 milliliters. The pH of the solution is adjusted with 5.0 N-sodium hydroxide to a value of pH 7.4 and 100 grams of sodium chloride is added. After filtration of the solution, this material is employed in the milk clot test. In determining total activity 10 milliliters of enzyme solution is mixed with 10 milliliters of an aqueous solution of 0.2 M-cysteine-hydrochloride-0.01 M-Versene previously adjusted to pH 6.0. The mixture is allowed to stand for 10 minutes and then diluted to 100 milliliters with deionized water. After incubating at 40° C. for 5 minutes, the enzyme preparation is ready for use.

A substrate is prepared by mixing 80 grams of low temperature spray dried skim milk powder and 290 milliliters of deionized water containing 50 milliliters of 0.1 M-cysteine-hydrochloride-0.01 M-Versene (previously adjusted to pH 6.0) and 6 milliliters of 4.0 M-calcium chloride. This substrate solution is also incubated at 40° C. for 30 minutes. 5 milliliters of the skim milk substrate is placed in a test tube and 1 milliliter of the enzyme solution is added, followed by heating of the mixture at 40° C. until the milk clots. The time in seconds required for clotting is proportional to enzyme activity as follows:

$$\frac{\text{Milk clot units}}{\text{Milliliter}} = \frac{60}{t \times E}$$

$t$=clotting time in seconds
$E$=milliliters of enzyme

B. *Avaliable milk clot activity.*—The enzyme solution prepared as in the total activity test but containing no cysteine-Versene is incubated at 40° C. for 5 minutes before mixture with the substrate. The substrate is made up of the following ingredients in the amounts noted:

Skim milk powder _____grams__ 80
Deionized water _____ml__ 360
4.0 M-calcium chloride _____ml__ 6

The substrate preparation is employed in 5 milliliter aliquots in a test tube and incubated at 40° C. for 30 minutes before using. Again, as in the case involving measurement of total activity, 1 milliliter of the enzyme solution is incubated with 5 ml. of substrate and the time for clotting to occur is noted.

TYROSYL UNITS TEST

The substrate is prepared by blending 100 grams of lean ground beef and 300 grams of water in a Waring Blendor for 6 minutes. 20 gram samples of this emulsion are placed in each of 12 bottles.

The enzyme solution should be diluted with water so that it contains about 10–30 total milk clot units per milliliter. 5 milliliters of this diluted solution is further diluted to 4,000 milliliters with deionized water. The solution is added to flasks containing the substrate at levels 0, 1, 2, 3, 4, and 5 milliliters per flask. Two bottles are used for each level of enzyme. The flasks are then swirled to mix the contents and incubated at 80° C. for 1 hour. At this time, the reaction is terminated by adding 40 milliliters of 20% aqueous trichloroacetic acid to the flask and shaking to mix. A precipitate forms and the flask is allowed to stand for 30 minutes at room temperature to permit completion of the reaction. The contents of the bottle are diluted to 200 ml. with distilled water and after thorough mixing the suspended suspension is filtered. A 2-milliliter aliquot from the filtrate in each flask is employed in the color measurement for tyrosyl color.

To each 2-milliliter filtrate sample is added the following:

| Reagent: | Amount, ml. |
|---|---|
| 0.25 N sulfuric acid | 8 |
| 20% aqueous sodium carbonate | 5 |
| Folin-Ciocalteau phenol reagent | 1 |

After the addition of the reagent the filtrate is permitted to stand for 30 minutes and the solution is then measured against a distilled water blank in a spectrophotometer at 540 mu. The amount of phenol color is estimated by comparing the percent transmission of the sample with that of similarly treated standards containing 0, 40, 60, and 80 micrograms of tyrosine in each tube.

In the preparation of the enzyme solution the dried enzyme powder as received is blended with an equal amount of glycerine, the blend is suspended in water and the activity in tyrosyl units, as well as the activity expressed as total milk clotting units and available milk clotting units is determined. The value for available milk clotting units can be decreased by reversibly inactivating the enzyme solution or fractionating the enzyme with a water miscible solvent in which the enzyme is insoluble such as acetone, dioxane or the lower alkyl alcohols. Suitable solvents include methanol, ethanol, propanol, isopropanol, tertiary butanol, ethylene glycol, methyl Cellosolve, and methyl ethyl ketone. An alternative method for decreasing the available milk clotting units is by means of salt fractionation with sodium chloride, sodium sulfate, sodium mono acid phosphate, potassium mono acid phosphate, potassium chloride, ammonium sulfate or other suitable salt. The concentration of the enzyme in solution is adjusted so that a reasonable volume of solution is injected into the animal to provide about 25–500 tyrosyl units per pound of live animal weight and about 1–8 total milk clot units per pound of live animal weight. Although in the preferred form about 100–400 tyrosyl units per pound is introduced into the animal very satisfactory results are obtained when about 50–400 tyrosyl units is employed. It is possible to prepare enzyme solutions having the desired characteristics from mixtures of papain, ficin, and bromelain.

Co-pending application Ser. No. 749,073, filed July 17, 1958, now abandoned, and continuation-in-part application Ser. No. 111,467, filed May 22, 1961, disclose procedures for inactivation, solvent fractionation, and salt fractionation. Solvents such as acetone and the lower alkyl alcohols are used in the solvent fractionation procedure, while sodium chloride, sodium sulfate, alkali metal phosphates, ammonium phosphates and sulfates can be employed in the salt fractionation process. Preconditioning by these methods insures that the enzyme will have a high proteolytic activity and will be relatively free of inactivating materials and inhibitors. Further inert proteins and other substrates resulting from the enzyme acting upon itself will be removed. Biuret protein analysis gives a measure of the amount of protein present in the composition and thus indirectly measures the quantities of impurities present. Enzyme compositions coming within the scope of this invention are characterized as having 50% or more biuret protein and a sufficient proteolytic activity so that less than 3.0 grams of the powder is required in suspension in 100 milliliters of water to provide an activity of at least about 1,000 tyrosyl units per milliliter. It is possible to prepare enzyme formulations with proteolytic enzyme having activities in the dry state of about 40,000–200,000 tyrosyl units per gram, with the enzyme being present in solution in amounts of about 0.13–12.5%.

Preconditoning of the crude enzymes, if it is desired to employ such enzymes, is illustrated by the following examples wherein milled commercial papain enzyme having the following characteristics is treated by various means to provide an enzyme formulation possessing the characteristics of those coming within the scope of the invention.

| | Percent |
|---|---|
| Biuret protein | 41 |
| Tyrosyl units per gram of powder | 19,100 |
| Total milk clot units per gram of powder | 315 |
| Available milk clot units per gram of powder | 112 |
| Grams powder per 100 milliliter H$_2$O to obtain 1,000 tyrosyl units per milliliter | 5.2 |

EXAMPLE I

*Crude*

The enzyme is a crude dried latex which has been milled so that the particles pass a 80 mesh screen. A 75 gram quantity of this papain enzyme was blended with 75 grams of C.P. glycerine to form a paste and the paste was suspended in 1,500 milliliters of distilled water. The crude solution was centrifuged and filtered to clarify and after Seitz filtration was employed in injecting mature sheep at levels equivalent to 0.1, 0.15, 0,20, 0.25, 0.30, 0.35, 0.70, and 1.25 milliliters per pound of live weight. These levels are for a solution having 1000 tyrosyl units per milliliter and any variation from such an activity is adjusted by increasing or decreasing the amount employed in each case.

*Aerated crude*

75 grams of the crude papain was blended with 75 grams of C.P. glycerine and the paste taken up in 1,200 milliliters of distilled water. The pH of the solution was adjusted to 7.4 with 5 N aqueous sodium hydroxide solution and the final volume was adjusted to 1,500 milliliters with distilled water. The solution was clarified by centrifuging and then filtering. The filtered solution was blended in a Waring Blendor for several 1-minute periods at time intervals of 4 minutes between blending, the total blending taking place over a period of 3 hours. The blended solution was then diluted to 5 times its volume and sterilized by filtration through a bacteria retentive filter pad. This solution was injected into mature sheep at the same level as set out previously for the crude enzyme.

*Peroxide inactivated crude*

100 grams of the crude milled papain and 100 grams of C.P. glycerine were mixed and the paste which was formed was taken up in 2,000 milliliters of 3% hydrogen peroxide. A solution of beef liver catalase containing 200 kiel units per milliliter was added at the rate of 6.65 kiel units per milliliter of enzyme solution over a period of 3½ hours. The solution was the clarified by filtration and the pH adjusted to 7.4 with 5 N aqueous sodium hydroxide. The final solution was sterilized by filtration through a Seitz bacteria-retentive pad and this solution was employed in injecting sheep at the levels noted previously for the crude enzyme.

*Sodium chloride fractionated crude*

The commercial crude milled papain (150 grams) was blended to form a paste with C.P. glycerine (150 grams) and the paste was taken up in 2,000 milliliters of distilled water. The pH of the solution was adjusted to 7.4 with the aqueous sodium hydroxide solution and held at this pH for 30 minutes. The pH of the solution was then adjusted to pH 3.5 and 685 grams of sodium chloride were added, followed by chilling of the solution to 10° C. The precipitate which was formed was collected by centrifuging and taken up in 2,260 milliliters of distilled water at pH 7.4. The solution was clarified and sterilized by filtration through a Seitz bacteria-retentive pad. The sterilized solution was injected into mature sheep at levels noted previously.

*Alcohol fractionated crude*

60 grams of commercial mill papain and 60 grams of C.P. glycerine were blended to form a paste and the paste was taken up in 1,200 milliliters of distilled water, cooled to 0° C. The pH of the solution was adjusted to 7.4 with 5 N aqueous sodium hydroxide and the solution was clarified by filtration. The enzyme was precipitated from this aqueous solution by the addition of 4,000 milliliters of ethanol. This amount of ethanol provides approximately an 80% ethanol solution. The precipitate which was formed was collected by centrifuging and then dissolved in 1,000 milliliters of distilled water at pH 7.4. 15 grams of sodium chloride were added and the solution sterilized by filtration through a bacteria-retentive Seitz pad. The sterilized solution was employed in the injection of mature sheep, as with the preceding samples.

*Acetone fractionated crude*

60 grams of commercial crude milled papain and 60 grams of C.P. glycerine were blended to form a paste and the paste was taken up in 1,200 milliliters of distilled water, chilled to 10° C. The pH of the chilled solution was adjusted to 7.4 and the solution was then clarified by filtration. The enzyme is precipitated from this aqueous solution by the addition of 3,000 milliliters of acetone cooled to 10° C. The precipitate was collected by centrifuging the solution and this precipitate was then dissolved in 1,000 milliliters of distilled water adjusted to pH 7.4. 10 grams of sodium chloride were added and the solution sterilized by filtration through a bacteria-retentive Seitz pad. The solution was injected into mature sheep at the levels noted previously.

*Sodium sulfate fractionated crude*

50 grams of crude milled papain and 50 grams of C.P. glycerine were blended to form a paste and the paste was taken up in 1,000 milliliters of distilled water. The pH of the solution was adjusted to 7.4 and the solution was held at this pH for 30 minutes, at which time the pH was adjusted to 5.0. 400 grams of sodium sulfate were added and the solution was stirred until the salt dissolved. 20 grams of filter aid was added and the precipitate which was formed was collected by filtration. The precipitate was taken up in 1,000 milliliters of distilled water at a pH of 7.4 and the solution was filtered to clarify and sterilize. This solution was used in injecting mature sheep, as with the foregoing samples.

*Dialyzed crude*

37.25 grams of commercial milled papain and 37.25 grams of C.P. glycerine were blended to form a paste and the paste was taken up in 745 milliliters of distilled water at pH 7.4. The solution was introduced into Visking dialysis tubing and dialyzed against distilled water for 48 hours. The final volume of the solution was 1,195 milliliters, representing a dilution of 1.6. 24 grams of sodium chloride were added and the solution adjusted to pH 7.4, followed by filtering through a bacteria-retentive Seitz pad to clarify and sterilize. This solution was injected into mature sheep at the levels noted previously.

It should be noted that the crude enzyme used in all of the foregoing purification procedures is taken from the same batch and thus the improvement provided by the various stabilizing and purifying methods can be related directly to the crude sample.

The analytical values for each of the samples is set forth in Table I which follows:

TABLE I

| Composition | Tyrosyl Units Per ml. | Milk Clot Units Per ml. | | Tyrosyl Units Per Milk Clot Unit | |
|---|---|---|---|---|---|
| | | Total | Available | Total | Available |
| 1. Crude | 813 | 16.4 | 4.6 | 50 | 177 |
| 2. Aerated Crude | 209 | 3.5 | 0.1 | 60 | 2,090 |
| 3. Peroxide—Inactivated Crude | 465 | 5.3 | 0.1 | 88 | 4,650 |
| 4. Sodium Chloride—Fractionated Crude | 611 | 9.8 | 0.2 | 63 | 3,050 |
| 5. Alcohol—Fractionated Crude | 890 | 14.8 | 0.7 | 60 | 1,271 |
| 6. Acetone—Fractionated Crude | 1,000 | 15.6 | 0.3 | 64 | 3,333 |
| 7. Sodium Sulfate—Fractionated Crude | 945 | 11.9 | 0.2 | 87 | 4,725 |
| 8. Dialyzed Crude | 750 | 9.6 | 0.2 | 78 | 3,750 |

When injected into sheep the treated compositions 2–8 at dosages up to around 0.70 ml./lb. induced no significant adverse physiological reactions and no significant lesions were observed in an inspection of the carcasses. Steaks and chops as well as roasts derived from the carcasses all were rated 8 or better for tenderness by a panel of experts. The numerical rating extends from 1 which is unsatisfactory to 10 which is superior.

The crude material on the other hand caused depression and accelerated breathing at the level of 0.15 ml./lb. and above. In addition, hemorrhaging was noted in the mediastinal lymph node and livers at dosages of 0.15 ml./lb. and above.

While the process and product of the invention are directed primarily to the procedure wherein live animals are treated, the compositions may also be used in the treatment of meat cuts which are dipped in enzyme or otherwise treated to obtain surface coating of the meat with enzyme.

Very highly purified materials can be prepared by an involved separation system to produce pure papain and pure chymopapain having substantial activities. Thus papain and chymopapain fractions having the following characteristics were isolated from a crude papain sample.

| | Activity/gm. Biuret Protein | Activity/gm. Electrophoretic Protein | Activity/gm. Chymopapain and Papain protein |
|---|---|---|---|
| Papain: | | | |
| Tyrosyl Units | 195,000 | 307,000 | 452,000 |
| Total Milk Clot Units | 3,500 | 5,600 | 8,200 |
| Available Milk Clot Units | 1,100 | 1,770 | 2,600 |
| Chymopapain: | | | |
| Tyrosyl Units | 117,500 | 370,000 | 660,000 |
| Total Milk Clot Units | 1,320 | 4,150 | 7,400 |
| Available Milk Clot Units | 100 | 300 | 540 |

Obviously many modifications and variations of the invention as hereinbefore set forth may be made without departing from the spirit and scope thereof and therefore only those limitations should be imposed as are indicated in the appended claims.

I claim:

1. An improved proteolytic enzyme formulation, in aqueous solution, manufactured from plant derived crude enzymes for ante-mortem injection into animals intended for slaughter, to both improve tenderness of animal flesh upon cooking and to avoid physiological reaction in the animal while alive, said formulation being characterized by: a total amount of tyrosyl units in the range of about 250–14,000 units per milliliter; an amount of total milk clotting units of about 4–280 units per milliliter; and a lowered amount of available milk clotting units of about 0–42 units per milliliter, said total and available milk clotting units being adjusted to maintain ratios of about 50–100 tyrosyl units per total milk clotting unit and of about 333, and higher, tyrosyl units per available milk clotting unit.

2. The formulation of claim 1 wherein tyrosyl units are present in the range of 500–5,000 units per milliliter; total milk clotting units are present at about 5–100 units per milliliter; and available milk clotting units present at about 0–15 units per milliliter.

3. The formulation of claim 1 wherein tyrosyl units are present in the range of about 500–1,000 units per milliliter; total milk clotting units are present in about 5–20 units per milliliter; available milk clotting units are present in about 0–3 units per milliliter; and the biuret protein analysis is at least 50%.

4. The composition of claim 1 wherein the aqueous enzyme solution is at about pH 7.4.

5. An improved method of conditioning proteolytic enzymes to provide an enzyme composition adapted for use in the ante-mortem treatment of meat bearing animals comprising: suspending crude plant derived enzymes in water to form a liquid suspension of enzyme; and subjecting said suspension to purification treatment to obtain an enzyme at about pH 7.4 and until the proteolytic activity of said enzyme reaches a ratio of tyrosyl units to total milk clotting units of about 50–100 and the ratio of typrosyl units to available milk clotting units is about 333 or higher.

References Cited by the Examiner

UNITED STATES PATENTS

| | | | |
|---|---|---|---|
| 2,219,209 | 10/1940 | Neufeld | 195—62 X |
| 2,805,163 | 9/1957 | Williams et al. | 99—107 |
| 2,903,362 | 9/1959 | Beuk et al. | 99—107 |
| 2,936,265 | 5/1960 | Whitehill et al. | 195—62 |
| 2,950,227 | 8/1960 | Gibian et al. | 195—66 |
| 2,956,928 | 10/1960 | Douglas et al. | 195—66 |
| 2,977,287 | 3/1961 | Bloch et al. | 195—62 |
| 2,999,020 | 9/1961 | Williams | 99—107 |
| 3,011,952 | 12/1961 | Lesuk | 195—66 |

A. LOUIS MONACELL, *Primary Examiner.*

HYMAN LORD, ABRAHAM H. WINKELSTEIN,
*Examiners.*